US010484232B2

(12) United States Patent
Hesketh et al.

(10) Patent No.: US 10,484,232 B2
(45) Date of Patent: Nov. 19, 2019

(54) CUSTOMIZED DOMAIN NAMES IN A CONTENT DELIVERY NETWORK (CDN)

(75) Inventors: Gifford Neal Hesketh, Newbury Park, CA (US); Christopher Newton, Westlake Village, CA (US); Mark Brady, San Rafael, CA (US); David Fullagar, Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 13/348,348

(22) Filed: Jan. 11, 2012

(65) Prior Publication Data

US 2012/0198043 A1  Aug. 2, 2012

Related U.S. Application Data

(60) Provisional application No. 61/432,195, filed on Jan. 12, 2011, provisional application No. 61/432,197, filed on Jan. 12, 2011.

(51) Int. Cl.
*G06F 15/16* (2006.01)
*H04L 29/12* (2006.01)

(52) U.S. Cl.
CPC .................. *H04L 29/1265* (2013.01)

(58) Field of Classification Search
CPC ......... H04L 29/08144; H04L 29/08198; H04L 29/08225; H04N 21/23103
USPC ....................................... 709/227, 245, 246
See application file for complete search history.

(56) References Cited

U.S. PATENT DOCUMENTS

| | | | | |
|---|---|---|---|---|
| 5,867,706 A * | 2/1999 | Martin et al. | | 718/105 |
| 7,228,359 B1 * | 6/2007 | Monteiro | | 709/245 |
| 7,363,361 B2 * | 4/2008 | Tewari et al. | | 709/223 |
| 8,037,157 B2 * | 10/2011 | Xiao et al. | | 709/218 |
| 8,065,383 B2 * | 11/2011 | Carlson et al. | | 709/217 |
| 8,108,555 B2 * | 1/2012 | Awadallah et al. | | 709/245 |
| 8,127,018 B2 * | 2/2012 | Frutiger | | 709/227 |
| 8,204,976 B2 * | 6/2012 | Swildens et al. | | 709/223 |
| 8,224,986 B1 * | 7/2012 | Liskov et al. | | 709/238 |
| 8,843,575 B2 * | 9/2014 | Carlson et al. | | 709/206 |
| 10,230,819 B2 * | 3/2019 | Richardson | | H04L 67/327 |
| 2003/0093523 A1 | 5/2003 | Cranor et al. | | |
| 2005/0267973 A1 | 12/2005 | Carlson et al. | | |
| 2008/0208961 A1 | 8/2008 | Kim et al. | | |
| 2009/0019143 A1 | 1/2009 | Frutiger | | |
| 2010/0257258 A1 | 10/2010 | Liu et al. | | |
| 2010/0268773 A1 | 10/2010 | Hunt et al. | | |

(Continued)

OTHER PUBLICATIONS

International Search Report, dated May 2, 2012, PCT/US12/20879, Intl. filing date Jan. 11, 2012, 3 pgs.

(Continued)

*Primary Examiner* — Douglas B Blair

(57) ABSTRACT

A computer-implemented method, operable in a content delivery network (CDN) including a plurality of cache servers and domain name servers. At a cache server in the CDN, a first domain name is obtained, the first domain name being associated with a client request for a resource from the cache server. One or more values associated with the client request are determined and a second domain name is generated, including information from the first domain name and information relating to the one or more values associated with the client request. The second domain name is provided to the client.

21 Claims, 13 Drawing Sheets

(56) References Cited

U.S. PATENT DOCUMENTS

2010/0306368 A1* 12/2010 Gagliardi et al. ............ 709/224
2012/0179814 A1* 7/2012 Swildens et al. ............ 709/224

OTHER PUBLICATIONS

Written Opinion, dated May 2, 2012, PCT/US12/20879, Intl. Filing Date Jan. 11, 2012, 5 pgs.
International Preliminary Report on Patentability, dated Jul. 16, 2013, Int'l Appl. No. PCT/US12/020879, Int'l Filing Date Jan. 11, 2012, 7 pgs.
Extended European Search Report, dated Jan. 15, 2016, Application No. 12734150.1, filed Jan. 11, 2012; 7 pgs.
Barbir, A. et al., "Known CDN Request-Routing Mechanisms draft-cain-cdnp-known-request-routing-03.txt", Internet Engineering Task Force, IETF, CH, No. 3; XP015011302 Nov. 1, 2001 , 16 pgs.
Canadian Examination Report, dated Oct. 6, 2017, Application No. 2,824,203, filed Jan. 11, 2012; 6 pgs.
Cain, B. et al., "Known CDN Request-Routing Mechanisms", Version 3, Network Working Group, Internet-Draft, Nov. 1, 2001, Taken from URL https://tools.ietf.org/html/draft-cain-cdnp-known-request-routing-03> on Sep. 19, 2017 , 17 pgs.
Canadian Examination Report, dated Oct. 4, 2018, Application No. 2,824,203, filed Jan. 11, 2012; 6 pgs.
European Examination Report, dated Jun. 12, 2017, Application No. 12734150.1, filed Jan. 11, 2012; 5 pgs.

* cited by examiner

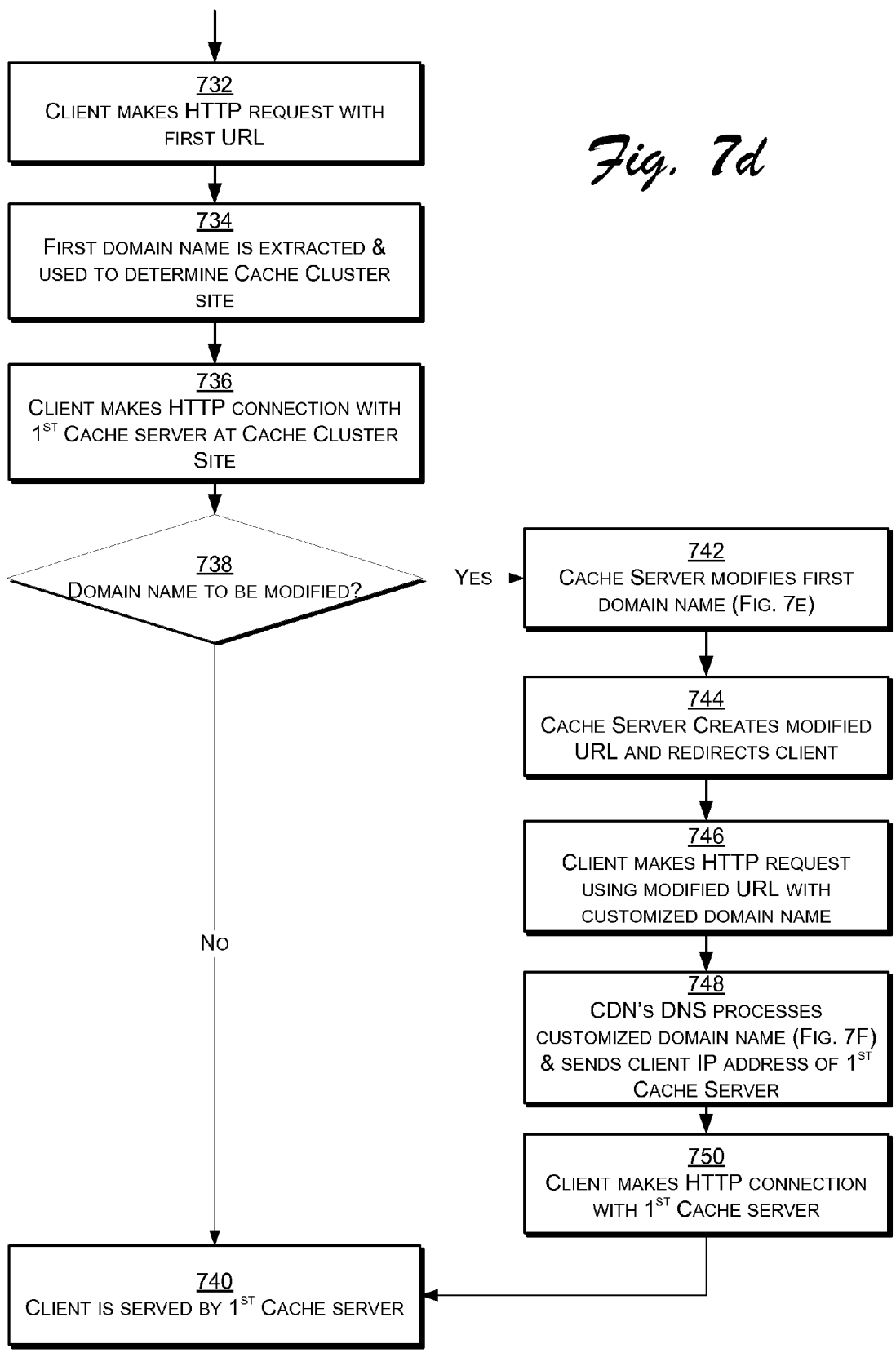

CUSTOMIZED DOMAIN NAMES IN A CONTENT DELIVERY NETWORK (CDN)

RELATED APPLICATIONS

This application is related to and claims priority from the following co-owned U.S. Provisional patent applications, the entire contents of each of which are fully incorporated herein by reference for all purposes:

Application No. 61/432,195, filed Jan. 12, 2011, titled "Redirection Of Network Traffic,"

Application No. 61/432,197, filed Jan. 12, 2011, titled "Redirection Of Network Traffic,"

BACKGROUND OF THE INVENTION

Copyright Statement

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to content delivery and content delivery networks. More specifically, to content delivery networks and systems, frameworks, devices and methods supporting content delivery and content delivery networks.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIGS. 7a-7d are flowcharts depicting aspects of operation of embodiments of CDNs using customized domain names.

DETAILED DESCRIPTION OF THE PRESENTLY PREFERRED EXEMPLARY EMBODIMENTS

Glossary

As used herein, unless used otherwise, the following terms or abbreviations have the following meanings:
CDN means content delivery network;
DNS means Domain Name System;
FQDN means Fully Qualified Domain Name;
HTTP means Hyper Text Transfer Protocol;
IP means Internet Protocol;
IP address means an address used in the Internet Protocol to identify electronic devices such as servers and the like;
URI means Uniform Resource Identifier; and
URL means Uniform Resource Locator.

BACKGROUND AND OVERVIEW

The Domain Name System (DNS)

An IP address is a numerical label assigned to each device (e.g., computer) participating in a computer network such as the Internet that uses the Internet Protocol for communication. An IP address functions for host or network interface identification and for location addressing. Although IP addresses are numbers, they are usually stored and displayed using notations, such as, e.g., 162.16.24.11 (for Internet Protocol Version 4—IPv4), and 2001:db8:0:2345:0:567:1:2 (for Internet Protocol Version 6—IPv6).

In networks such as the Internet, computers (e.g., servers) are typically organized (logically) in an hierarchical system of domains. Each computer has at least one network address (e.g., an IP address) that is used, inter alia, by other computers to connect to that computer. Each computer may also be associated with one or more domains, and, in that regard, each computer has one or more hostnames that can be used to map (directly or otherwise) to the computer's network address. Examples of domains (and domain names) are ".com", ".net", ".gov", "cnn.com", "wipo.int", "uspto.gov", "www.weather.com", "a.b.cdn.net", and so on. A hostname is a domain name (preferably a fully qualified domain name—FQDN) that identifies a particular computer (or group of computers) in a network.

The process of obtaining one or more network addresses associated with a hostname is called domain name resolution (or sometimes just name resolution). Name resolution is generally performed by a domain name system (DNS)— more specifically, by one or more name servers in a DNS.

Figure 1:
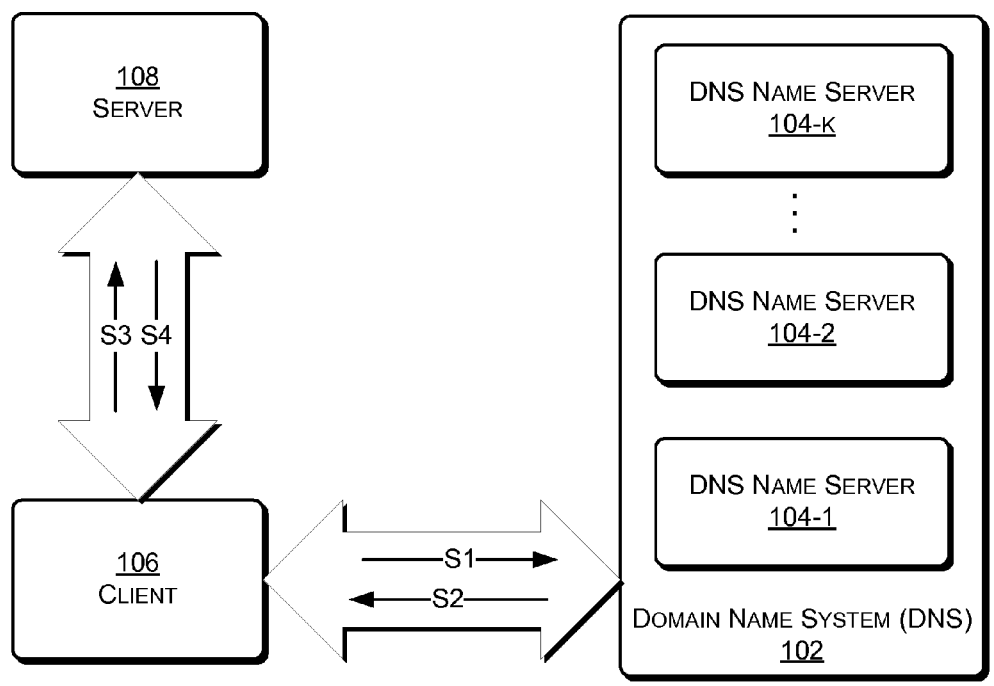
FIG. 1 depicts operation of a domain name system.

A domain name system is an hierarchical system that is used, inter alia, to resolve domain names—i.e., to map domain names to corresponding network addresses or to other domain names. As shown, e.g., in FIG. 1, Domain Name System 102 is made up of one or more name servers 104-1, 104-2, . . . , 104-k (collectively referred to as name servers 104).

Network domains may be organized hierarchically, to include one or more sub-domains. Thus, e.g., the domain name "a.b.cdn.net" corresponds to a sub-domain "a" ("a.b.cdn.net") in a sub-domain "b.cdn.net" in a sub-domain "cdn.net" in a sub-domain "net" (actually in a sub-domain ".") There may be one or more DNS name servers that are responsible for name resolution in each domain and sub-domain. At least one name server must be authoritative for name resolution in each domain and sub-domain.

In the domain name "a.b.cdn.net", the domain "net" (or ".net") is considered a top-level domain, with "cdn.net" being the next domain below it, and so on.

The process of name resolution for a domain name generally involves providing the domain name to a DNS name server which either provides an answer or queries a name server that should know the answer.

Resources and Uniform Resource Locators (URLs)

As used herein, resources may be any static or dynamic data item comprising an arbitrary sequence of bits, regardless of how those bits are stored or transmitted, and regardless of what those bits represent. A resource provided by a CDN may comprise data representing some or all of another resource, including some or all of: a file, a portion of a file, a digital message, a portion of a digital message, a digital image, a portion of a digital image, a video signal, a portion of a video signal, an audio signal, a portion of an audio signal, a software product, a portion of a software product, a page in memory, a web page, a movie, and a portion of a movie. This list is given by way of example, and is not intended to be in any way limiting.

In networks such as the Internet, resources are identified by URLs (or URIs), and client requests for resources are generally made using URLs (or URIs) for those resources, each resource typically being identified by its own URL (or URI). URLs are defined in Network Working Group RFC 1738, "Uniform Resource Locators (URL)", by T. Berners-Lee et al., URIs are described in Network Working Group RFC 2396, "Uniform Resource Identifiers (URI): Generic Syntax," by T. Berners-Lee et al., August, 1998, the entire contents of both of which are fully incorporated herein for all purposes.

A URL has the form:

<<protocol>>://<<domain>>/<<path>> where <<protocol>> may be, e.g., "http", "https", "ftp", "rtmp", and so on; <<domain>> is a domain name (generally a fully qualified domain name—FQDN); and where <<path>> specifies a location of the resource in the domain.

When a client computer requests a resource using a URL (e.g., using a browser or the like), the hostname associated with that URL must be mapped to a computer (or computers) having that resource. With reference again to FIG. 1, by way of example, the client 106 (or a resolver on the client 106) passes the hostname (e.g., "<<domain>>" in the example above) associated with the URL to the DNS 102 (at S1) and receives back from the DNS one or more network addresses (IP addresses) of one or more servers 108 identified by the hostname in the URL (at S2). The client may then connect to server 108 using a network address obtained from the DNS, using a port number taken from the URL (or implicitly specified by protocol), and request the resource identified by the <<path>> portion of the URL (at S3), the style of the request being determined by the protocol of the URL. The server 108 then serves the requested resource to the client (at S4).

Typically a client has a DNS name server associated therewith, and the client's resolver will make name resolution requests to that name server. That name server may be a name server of the client's service provider (ISP). The client's name server interacts with other name servers 104 in the DNS 102 in order to resolve a hostname or domain name.

Content Delivery Networks (CDNs)

Networks that are engaged to deliver electronic resources, such as video, images, audio files, documents, software and the like, to end users on the Internet on behalf of owners or providers of those resources ("content providers") are commonly referred to as Content Delivery Networks (CDNs). A primary purpose of a CDN is to distribute resources efficiently to client machines on behalf of one or more content providers, preferably via a public Internet. Both end-users (clients) and content providers benefit from using a CDN. By using a CDN, a content provider is able to take pressure off of its own servers. Clients benefit by being able to obtain content with fewer delays.

Figure 2:
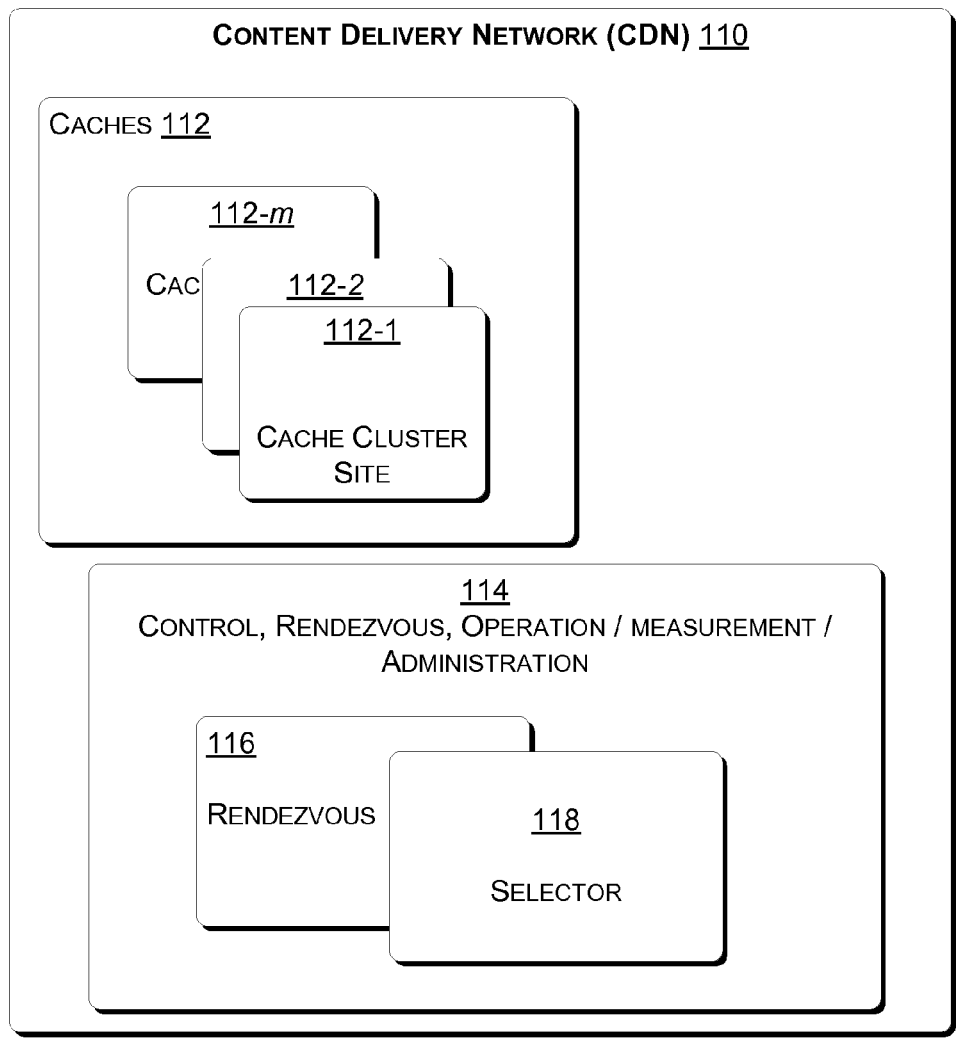
FIG. 2 depicts a content delivery network (CDN)

An example of a CDN is shown in FIG. 2, and represented as CDN 110. An exemplary CDN 110 will typically have multiple points of presence, or cache cluster sites 112-1, 112-2, . . . 112-m (collectively caches 112), located across a wide geographic area. A CDN 110 also includes other components (collectively denoted 114 in FIG. 2) such as, e.g., components for control, administration, rendezvous, operation, measurement, etc. The CDN's rendezvous system 116 and selector system 118 are described in greater detail below.

Exemplary operation or use of the CDN 110 is described with reference to FIGS. 2 and 3. When a particular client (e.g., client 120) wants to obtain a particular resource, that client is typically directed to a "best" (or "optimal") location (via rendezvous system 116 in conjunction with the selector system 118). As used here, a location may be, e.g., a server, a server site, a region of servers, a cache cluster, a cache cluster site, etc. The location may be another CDN or network or a server outside the CDN 110. The "best" or "optimal" location may be, without limitation, a cache cluster site, a cache cluster, a group, a tier, or some combination thereof.

Those of skill in the art will realize and understand, upon reading this description, that the notion of a "best" location is dependent on multiple factors, including, without limitation, some or all of the following: network load, load on the CDN servers and other components, location of the client computer, etc. The notion of a "best" location may vary by time of day, type of content, content provider policies, CDN policies, etc. The invention is not to be limited in any way by the manner in which a "best" location in the CDN is determined.

The rendezvous system 116 is thus used to direct client resources requests, usually to cache sites 112 in the CDN 110. The rendezvous system 116 uses, e.g., a selector mechanism 118 in order to direct clients requests to a location (e.g., cache cluster site 112-1) that is "optimal" or "best" for that client at that time.

The rendezvous system 116 is preferably implemented using the domain name system and comprises one or more DNS name servers. The rendezvous mechanism preferably includes domain name servers implementing policy-based domain name resolution. Exemplary rendezvous systems 116 are described in U.S. Pat. Nos. 7,822,871 and 7,860,964, the entire contents of each of which are fully incorporated herein for all purposes.

The selector mechanism 118 may be fully or partially integrated into the rendezvous system 116. The "best" server may be selected by a server selection mechanism such as described in U.S. Pat. No. 6,185,598, the entire contents of each of which are fully incorporated herein for all purposes. In a presently preferred implementation, the server selection mechanism is part of and uses the DNS system.

Figure 3:
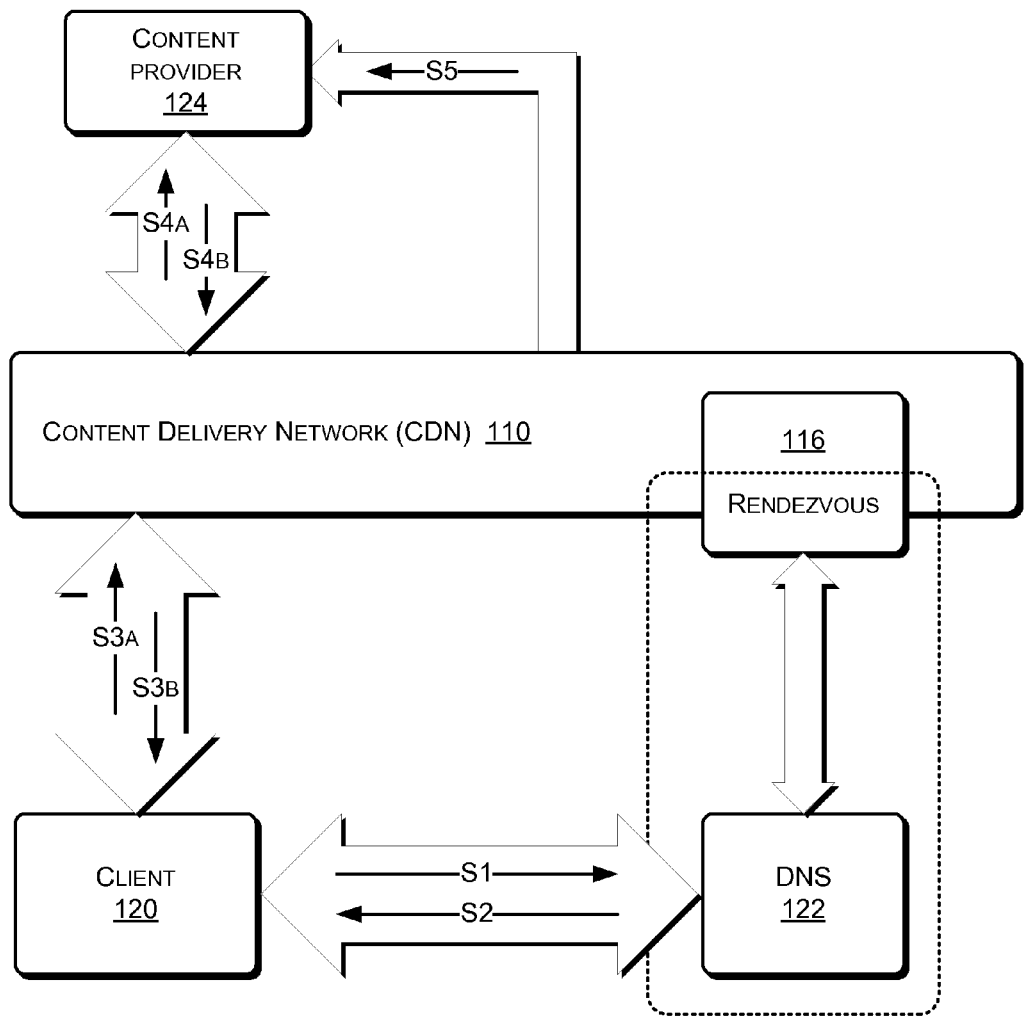
FIG. 3 depicts operation of the CDN of FIG. 2.

With reference to FIGS. 2-3, an exemplary use of the CDN 110 (in which the client 120 wants to obtain a particular resource) is as follows:

The client computer 120 interacts with the rendezvous system 116 in order to determine the "best" location from which to obtain the particular resource (at S1). When the rendezvous system 116 is integrated into the DNS system (as shown by the dotted line in FIG. 3) the client's DNS system 122 interacts with the CDN's rendezvous system 116 to direct the client to a location, preferably in the CDN 110, from which the client can obtain the resource. When the rendezvous system 116 is integrated into the DNS system, this request (at S1) may be part of a request to resolve a domain name associated with the particular resource, and the rendezvous mechanism may provide the client with one or more IP addresses or CNAMEs of one or more locations in the CDN (at S2).

Those of skill in the art will realize and understand, upon reading this description, that the name server(s) of the CDN

110 are invoked as part of the name resolution process for hostnames (or domain names) for which the CDN is authoritative.

Having obtained a "best" location from which to obtain the particular resource, the client computer 120 then requests the particular resource from the location(s) in the CDN 110 (at S3a) specified by the one or more IP addresses. The CDN 110 may already have a copy of that particular resource at that location, in which case it provides (serves) the resource to the client computer 120 (at S3b). If the CDN did not already have a copy of that particular resource at that location, then it tries to obtain a copy at that location (either from another location in the CDN or from the content provider 124) (at S4a, S4b). Having obtained the resource (either from another location in the CDN or from the content provider 124), the CDN 110 provides (serves) the resource to the client computer 120 (at S3b).

CDN Logical Structure

Figure 4:
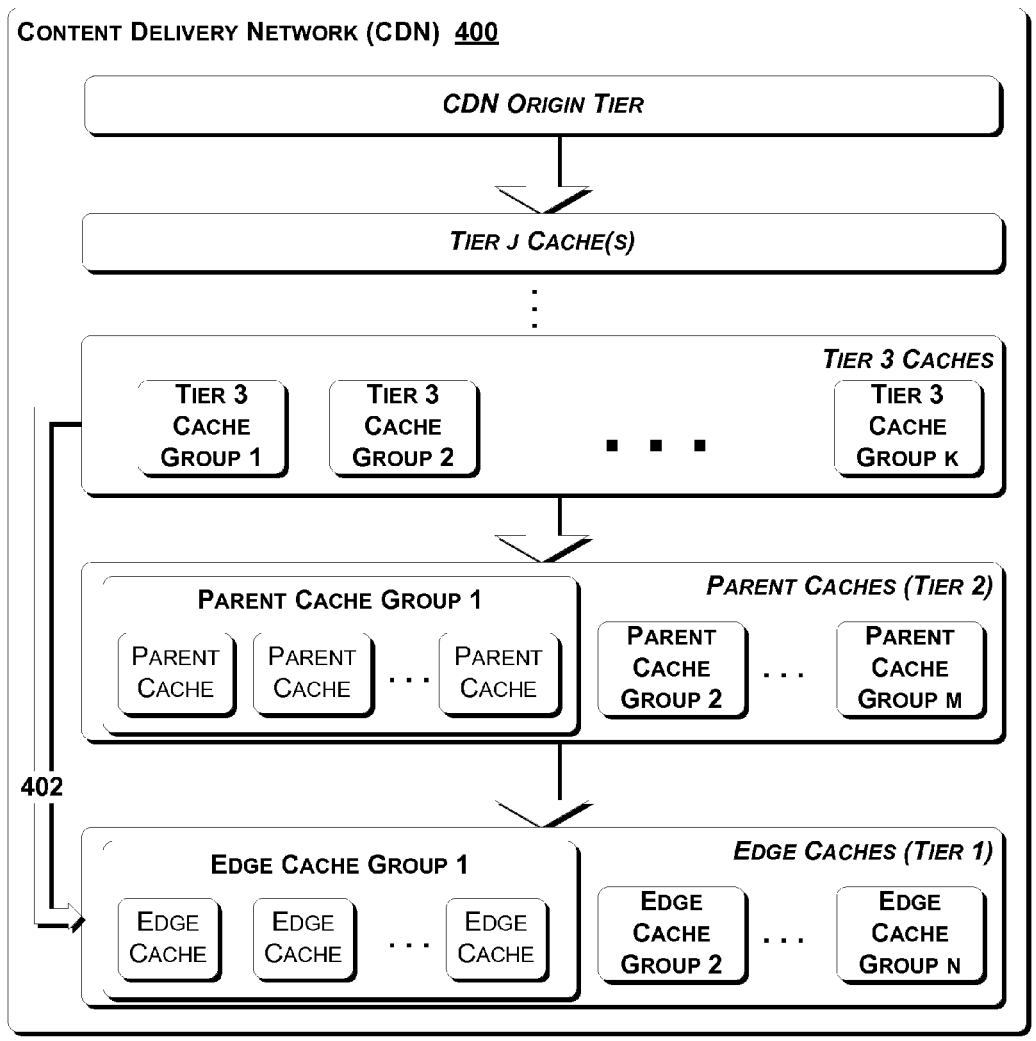
FIGS. 4-5 depict exemplary logical organization/structure of the CDN of FIG. 2.

A CDN may have one or more tiers of caches, organized hierarchically. FIG. 4 depicts a content delivery network 400 that includes multiple tiers of caches. Specifically, the CDN 400 of FIG. 4 shows j tiers of caches (denoted Tier 1, Tier 2, Tier 3, . . . , Tier j in the drawing). Each tier of caches may comprise a number of caches organized into cache groups. A cache group may correspond to a cache cluster site or a cache cluster. The Tier 1 caches are also referred to as edge caches, and Tier 1 is sometimes also referred to as the "edge" or the "edge of the CDN." The Tier 2 caches (when present in a CDN) are also referred to as parent caches.

For example, in the CDN 400 of FIG. 4, Tier 1 has n groups of caches (denoted "Edge Cache Group 1", "Edge Cache Group 2", . . . , "Edge Cache Group n"); tier 2 (the parent caches' tier) has m cache groups (the i-th group being denoted "Parent Caches Group i"); and tier 3 has k cache groups, and so on. Preferably each tier has the same number of cache groups, although this is not required.

Figure 5:
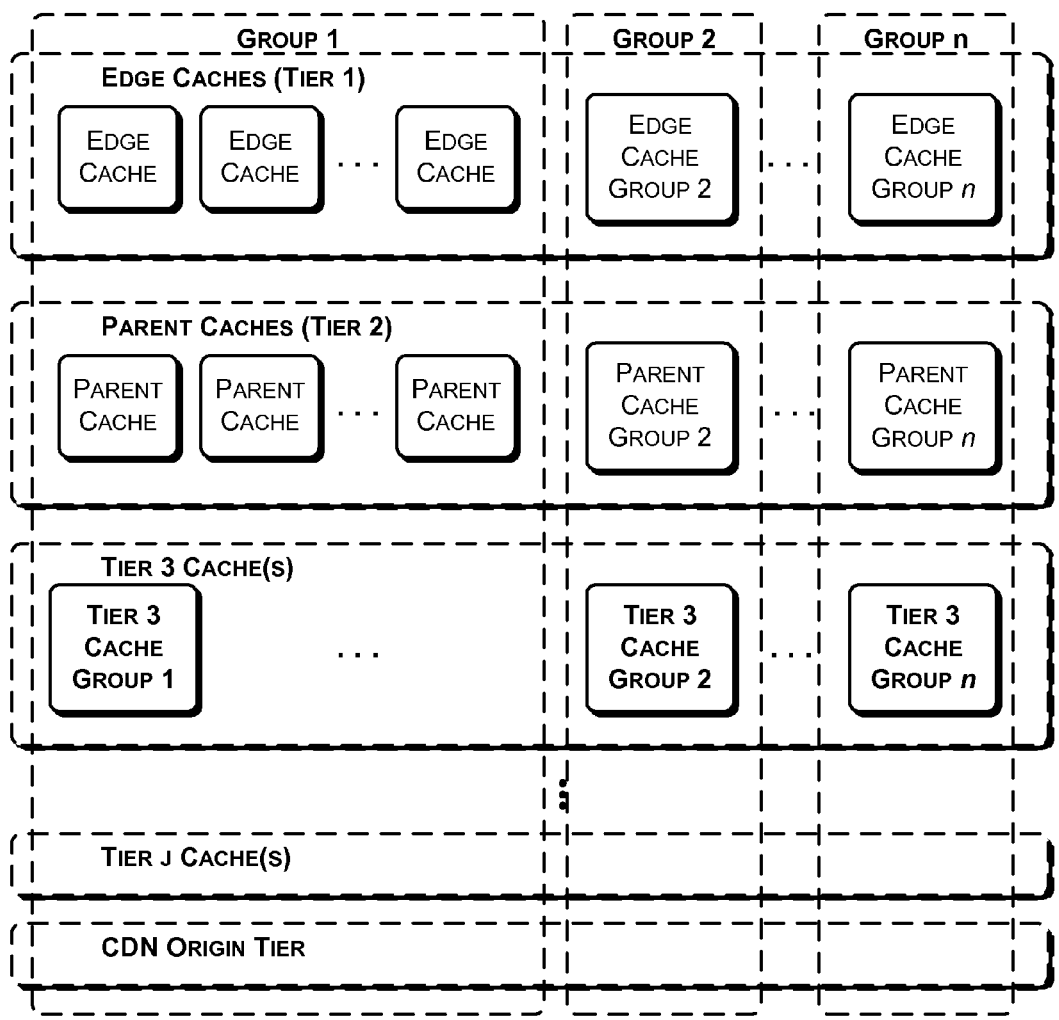

FIG. 5 shows the logical organization/grouping of caches in a CDN of FIG. 4. In the exemplary CDN 400 of FIG. 5, each tier of caches has the same number (n) of cache groups. Those of skill in the art will know and understand, upon reading this description, that each cache group may have the same or a different number of caches. Additionally, the number of caches in a cache group may vary dynamically. For example, additional caches may be added to a cache group to deal with increased load on the group.

The caches in a cache group may be homogenous or heterogeneous, and each cache in a cache group may comprise a cluster of physical caches sharing the same name and/or network address. An example of such a cache is described in co-pending and co-owned U.S. published Patent Application No. 2010-0332664, and in U.S. Pat. No. 8,015,298, titled "Load-Balancing Cluster," issued Sep. 6, 2011, the entire contents of each of which are fully incorporated herein by reference for all purposes.

Caches in the same tier and the same group are sometimes referred to as peers or peer caches. In general, for each Tier j, the caches in Tier j are peers of each other, and the caches in Tier j+/are parent caches.

A typical CDN has only one or two tiers of caches. A CDN with only one tier will have only edge caches, whereas a CDN with two tiers will have edge caches and parent caches. (At a minimum, a CDN should have at least one tier of caches—the edge caches.)

The grouping of caches in a tier may be based, e.g., on their physical or geographical location. For example, a particular CDN may have six groups—four groups of caches in the United States, group 1 for the West Coast, group 2 for the mid-west, Group 3 for the northeast and Group 4 for the south east; and one group each for Europe and Asia.

Those of skill in the art will realize and understand, upon reading this description, that cache groups may correspond to cache clusters or cache cluster sites.

A particular CDN cache is preferably in only one cache group.

In general, some or all of the caches in each tier can exchange data with some or all of the caches in each other tier. Thus, some or all of the parent caches can exchange information with some or all of the edge caches, and so on. For the sake of simplicity, in the drawing (FIG. 4), each tier of caches is shown as being operationally connectable to each tier above and below it, and Tier 3 is shown as operationally connected (via 402 in FIG. 4) to Tier 1 (the Edge Tier). In some CDNs, however, it may be preferable that the caches in a particular tier can only exchange information with other caches in the same group (i.e., with peer caches) and/or with other caches in the same group in a different tier. For example, in some CDNs, the edge caches in edge cache group k, can exchange information with each other and with all caches in parent cache group k, and so on.

A content provider's/customer's server (or servers) are also referred to as origin servers. A content provider's origin servers may be owned and/or operated by that content provider or they may be servers provided and/or operated by a third party such as a hosting provider. The hosting provider for a particular content provider may also provide CDN services to that content provider. With respect to a particular subscriber/customer resource, a subscriber/customer origin server is the authoritative source of the particular resource. More generally, with respect to any particular resource (including those from elements/machines within the CDN), the authoritative source of that particular resource is sometimes referred to as an origin server.

A CDN may also include a CDN origin/content cache tier which may be used to cache content from the CDN's subscribers (i.e., from the CDN subscribers' respective origin servers). Those of skill in the art will know and understand, upon reading this description, that a CDN can support one or more content providers or subscribers, i.e., that a CDN can function as a shared infrastructure supporting numerous content providers or subscribers. The CDN origin tier may also consist of a number of caches, and these caches may also be organized (physically and logically) into a number of regions and/or groups. The cache(s) in the CDN origin tier obtain content from the content providers'/subscribers' origin servers, either on an as needed basis (a pull) or in advance (via a push).

Customized Domain Names

As described above, the CDN preferably uses the domain name system (and DNS name servers) to perform various operations, including rendezvous, policy control, etc. When a client makes a request for a resource using a URL, regardless of what information is available in the URL itself, and regardless of what information is available when an HTTP request is made, for the first part of the process—the name resolution part—the DNS name servers see only a domain name (a hostname or FQDN). For example, for the exemplary URL:

http://domain_name/path the DNS name servers are only provided with the hostname "domain_name", and not with the path or protocol information.

It should be noted that if a URL contains a domain name that is not a FQDN, the resolver may complete (or expand) the domain name to make it a FQDN prior to giving it to the DNS.

The inventors realized that it would be beneficial to provide additional information to the rendezvous system and to other systems in the DNS in order, e.g., to be able to provide improved rendezvous and/or policy control.

Accordingly, as described below, in various embodiments, the DNS system is provided with customized domain names, preferably customized at request time. These customized domain names may include any information available to HTTP and from HTTP headers. As will also be described below, in various embodiments the customized domain names can be used by a name server to collect information and to make static and/or dynamic assessments of aspects of the network.

According to example embodiments, a customized domain name can comprise, but is not limited to, information/attributes associated with the requesting client computer (e.g., IP address of the client computer), the requested content's title or identifier, an encoding associated with the requested content, a device associated with the end-user (e.g., PC, set-top box, etc.), a protocol associated with delivery of the requested content, a downloadable identifier associated with the requested content and/or CDN, a bitrate associated with delivery of the requested content, a popularity metric/value associated with the requested content, a service level associated with the requesting end-user and/or content provider, a signature and/or token authentication associated with the customized domain name, etc. In general, customized domain names can include any information that could be included in an HTTP header (including the URI) and any information that could be known/available at the time of the HTTP request.

A customized domain name may be generated by one or more of: a name server (e.g., the client's name server), a content provider, a cache server or cache server site, an origin server or origin server site, a browser script, a resolver, a browser, in addition to any other entity suitable for generating domain names. For example, a browser script may modify URLs (or hostnames for URLs) in a web page. This modification may be made when the web pages are initially loaded or when requests are made for resources embedded in those pages.

There are two types of information that may be included in a customized domain name. The first type of information is information for which the DNS system will need specific values. An example of this first type of information includes the client's IP address. The second type of information is information that may be classified in some way, e.g., the type of content requested, what kind of device the client is (e.g., phone, television, computer, etc.), and so on.

In one embodiment, each item of information encoded in a customized domain name has an associated key or tag, e.g., "i" for IP address, "b" for bit rate, "m" for machine type, etc. If a particular item of information is to be included in the customized domain name, then the key for that item must also be included as part of that name. Preferably the keys for all values are concatenated to form a string, e.g., "imb" to mean that the domain name will include values for the IP address, the machine type and the bit rate, in that order. In general, if there are n keys with keys $k_1, k_2, \ldots, k_n$ to be included in a domain name, in that order, the keys are concatenated for form the string "$k_1 k_2 \ldots k_n$". The values corresponding to those keys (which may be specific values or classifications) are to follow the keys in the same order as the keys.

So, for example, suppose that a particular request includes a URL:

http://PQR.CDN.net/path/ABC.mov (URL1)

and that this request is being made from a television set with an IP address of 123.234.12.125. Suppose, for this example, that the "i" is the key for IP address, "b" for bit rate, and "m" for machine type, and that the code for a television is "t".

An exemplary corresponding customized domain name may be:

PQR.im.123.234.12.125.t.CDN.net (D1)

In this example (D1 above), the bit rate is not encoded. The IP address is encoded as 123.234.12.125, and the machine type is encoded as "t" for television.

When the customized domain name D1 is sent to the domain name system, it will be sent to a name server for the domain "CDN.net". That name server will parse the domain name to extract the key/value pairs, and then resolve the name "PQR.CDN.net", possibly using some or all of the information that was provided with the key/value pairs.

Those of skill in the art will realize and understand, upon reading this description, that the format and key names described are given by way of example, and that other formats and key names may be provided. It should be appreciated, however, that any encoding should resolve at least to the domain of a name server that can, at least, extract the original domain name from the modified domain name. In the case of a CDN, with domain names written as described above, the right side of the modified domain preferably includes the domain of the CDN.

Those of skill in the art will realize and understand, upon reading this description, that some or all of the values in the key/value pairs may be encoded or encrypted.

As noted above, some of the values of some of the keys comprise information (e.g. encoding rate, client device type) that may be classified in some way. This information may, in some embodiments be hashed in order to encode the classification information. Even if the original information may not be obtainable from a hash of the value for some types of information, hashing of values may still be useful to differentiate between two values (e.g., to determine whether or not two values are equal or different). For example, an encoding rate or some other information may be hashed in order to provide a value for comparison against a future or prior hash of the same data. In these cases the hash value essentially provides a one-way encoding function. However, since two identical values will be encoded the same way by the same hash function, the initial (unencoded) versions of any two values can be compared for equality. Values that can be hashed are values where the specific value is not meaningful, but which being able to differentiate such opaque values is of interest.

For instance, the following domain name represents an example customized domain name associated with particular requested content, content provider B, and content delivery network C:

B.xyz.$x_h\ x_h\ x_h\ x_h$. $y_h\ y_h\ y_h\ y_h$. $z_h\ z_h\ z_h\ z_h$.C.com (D2)

In this example customized domain name D2, "B" (or a similar identifier) indicates content provider B, "xyz" are keys of key-value pairs that indicate the information/attributes included in the customized domain name (e.g., x=client IP address, y=title of requested content, and z=bitrate associated with delivery of the requested content), "$x_h\ x_h\ x_h\ x_h$" indicates the tokenized hash value of "x" for that particular key-value pair, "$y_h\ y_h\ y_h\ y_h$" indicates the tokenized hash value of 'y' (e.g., title of requested content) for that particular key-value pair, "$z_h\ z_h\ z_h\ z_h$" indicates the tokenized hash value of 'z' (e.g., bitrate associated with delivery of the requested content) for that particular key-value pair, and "C.com" (or similar identifier) indicates the domain for content delivery network C. Note that, at least in this example domain name, since there are three keys "xyz", a name server will understand (e.g., during parsing of the hostname) that three respective value pairs will follow in the domain name. Further note that any combination of keys (i.e., zero or more keys) can be used in the domain name in any given order. For example, the ordering can indicate the relative weight or importance a given key/attribute should receive with respect to redirection of the request within CDN. It should be further noted that the configuration and representation of the content provider identifier, the zero or more key-value pairs, the content delivery network identifier, and/or any other information suitable for use in domain names, are not limited to the example embodiment/domain name provided above, and are contemplated to be configured and/or represented in any order or fashion associated with generating, parsing, administering, etc., domain names.

It should be appreciated that the domain name D2 above is a customized version of the following domain name D3:

B.C.com (D3)

Recall that the name server(s) of the CDN 110 are invoked as part of the name resolution process for hostnames (or domain names) for which the CDN is authoritative. Therefore, in this case, since "C" is the content delivery network (i.e., "C.com" is a domain of the CDN), the processing of all information to the left of "C.com" in domain name D2 (or D3) is performed by the DNS names server(s) of the CDN.

Note that there is no requirement that C.com identify the CDN—for example, C.com may be in a subdomain of the customer domain that is delegated to the CDN.

There are a number of locations in the system at which domain names may be usefully rewritten. These include: (1) at the client (e.g., in the resolver); and (2) at a cache server in the CDN or the origin server.

A client's resolver (e.g., resolver 605 in FIG. 6) or some other mechanism on the client may be modified to rewrite domain names (as described herein) for certain kinds of requests (e.g., request to certain domains or to indicate the original FQDN being requested (i.e., to embed the name into the CNAME returned from an initial inquiry) or to include the requestors (the client) IP address).

A cache server (e.g., edge cache server 612 and/or parent cache server 614) or an origin server 616 may be modified to rewrite domain names (as described herein) for certain kinds of requests. In these cases, the clients may be redirected to different cache servers. Once a client has been directed to a cache server and has an HTTP connection with that cache server, the cache server knows some information about the client and about the request that the DNS system did not know. For example, the cache server knows the client's IP address and it knows information that was included in the HTTP headers that were used to make the connection. That cache server can then modify the domain name in the URL that was used to make the request and redirect the client (e.g., with an HTTP REDIRECT instruction) to the URL with the modified domain name.

The client will then make the request again, this time using the modified URL with the modified domain name. Since the DNS will have extra information encoded in the modified domain name, it may be able to make a better cache site selection for that client request. As described below, in some cases the request is not directed to a different server.

Those of skill in the art will realize and understand, upon reading this description, that for requests for small objects (e.g., small image files that are part of a web page), it may not be worthwhile to redirect a client request (since the redirection time may exceed the time it would take to actually serve the content). However, for large objects (such as movies and for streamed objects), the overhead of modifying the domain name and redirecting the client may be worth the benefits.

In some embodiments a hostname may be modified to include an indication of the actual resource being requested. E.g., for URL1 from above (http://PQR.CDN.net/path/ABC.mov), the modified hostname could include/encode "path/ABC.mov" in some manner. For example, the modified hostname may look like "path_ABC_mov.PQR.CDNnet" (perhaps including other information too). In this way the DNS will actually know exactly which resource is being requested when it selects a server in the CDN. It should be appreciated that the actual name of the resource (in this example "path/ABC.mov" or "ABC.mov") may be encoded.

Example

Figure 6:
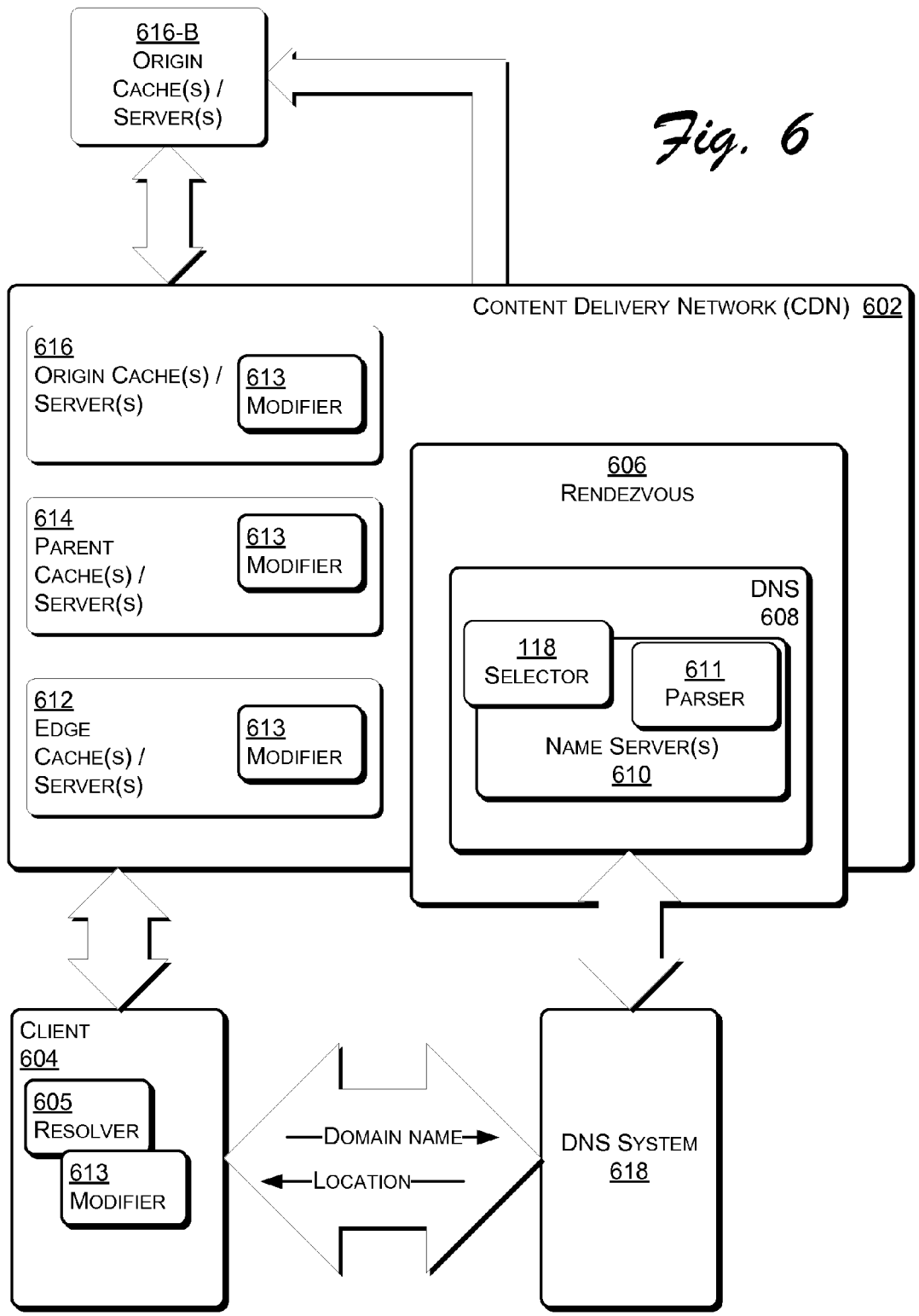
FIG. 6 depicts operation of a CDN using customized domain names.

FIG. 6 illustrates an example network environment suitable for implementing various embodiments disclosed herein. The example network environment of FIG. 6 comprises a content delivery network 602 and an end-user/client 604 (e.g., end user device such as a PC, laptop, mobile device, etc., and/or media player or similar content playback application executed by such a device). The example network configuration further comprises a content delivery network 602.

The client 604 is operable to issue a request for content associated with a content provider (e.g., a request for movie ABC associated with content provider PQR). The request may have been an HTTP request associated with a URL of the form:

http://PQR.CDN.net/path/ABC.mov (URL2)

which includes a domain name (hostname "PQR.CDN.net"). The domain name associated with the request may be associated with the CDN 602, and may be modified/customized to be of the form:

PQR.XyZ.$X_{value}$.$y_{value}$.$z_{value}$.CDN.net (D4)

The customized domain name can comprise information and/or attributes associated with, for example, but not limited to, an end-user, the particular content being requested, the location of the client, and the like.

Still referring to FIG. 6, the content delivery network 602 comprises a DNS 608 made up of one or more CDN name servers 610. These CDN name servers 610 are part of the CDN's rendezvous system 606 and are configured to receive and process, for example, requests to resolve domain names, wherein the domain names can comprise customized domain names as described above. As shown in the drawing, the DNS 608 includes a parser 611 that extracts encoded information from customized domain names.

In this example configuration, CDN 602 comprises one or more edge caches/servers 612, one or more mid-tier and/or parent caches/servers 614, and origin cache/server(s) 616 associated with the content provider specified in the customized domain name. The origin cache/server(s) 616 may be situated within the CDN 602. In another example embodiment, the network configuration comprises (in addition to or in lieu of origin cache/server(s) 616) origin cache/server(s) 616-B situated outside of CDN 602 (e.g., situated within the content provider domain and/or network).

The customization/modification of the domain name may take place, e.g., at the client 604 using modifier routine(s) 613 (possibly integrated into the client's resolver 605), and/or at the cache servers using modifier routines 613 associated therewith. While each group of cache servers (612, 614, 616) is shown in the drawing as having modifier routines 613 associated therewith, it should be appreciated that in a particular implementation, some or all of the individual cache servers will each have modifier routines associated therewith. It should also be appreciated that in some implementations the clients or the caches may not have modifier routines associated therewith.

In order to resolve a customized name (e.g., D3), the client 604 (the client's resolver 605) invokes or calls a DNS name server (i.e., a name server in the DNS system 618) that is associated with end-user/client 604. The client's name server passes the name resolution request (directly or indirectly) to the CDN DNS 608 and thus to a CDN name server 610 associated with the CDN domain (in this example, "CDN.net").

Depending on the CDN name server 610's processing/parsing of the customized domain name, the CDN name server 610 (and/or a selector 118 associated therewith) selects as a location (or domain) one of: an edge cache server 612, a parent cache server 614, origin cache/server 616, or origin cache/server 616-B (or to another CDN).

The rendezvous system (via name server 610 and DNS 618) then provides an address (e.g., an IP address) or CNAME corresponding to the selected location or domain to the client 604 via the client's name server.

The client then makes the request from a server associated with one of the address or domain.

Those of skill in the art will realize and understand, upon reading this description, that customized domain names can provide more efficient and streamlined administration, data management, dynamic processing/redirection/delivery, etc., of content with respect to popularity.

For example, if a customizable domain name comprises information and/or attributes related to the particular content that is being requested, the CDN's rendezvous system 606, using CDN name server 610, can determine a respective popularity value or metric associated with the requested content and redirect the request within CDN 602 accordingly. For example, if the information/attributes associated with a requested movie indicate that the requested movie is relatively popular (e.g., via processing performed by name server 610), then CDN name server 610 can select an edge cache server 612 to serve or deliver the requested movie. If, on the other hand, the requested movie is deemed to be relatively unpopular, then CDN name server 610 can select a cache server configured in one or more intermediate tiers between edge servers and origin servers), or even origin servers to serve the requested movie.

It should be appreciated that the rendezvous system 606 (and its components name server(s) 610 do not themselves serve the requested content to the client. They provide the client with a location (e.g., address or domain) from which the client may request the content. That address or domain may be a location (e.g., cache/server/cluster) within the CDN or it may be outside the CDN (e.g., an content provider server or another CDN).

Customized domain names can provide other advantages (in and of themselves, or in addition to the advantages discussed above with respect to content popularity) by providing improved redirection (e.g., rendezvous) of requests to caches/servers within CDN 602. The selector system (selector 118 in FIG. 2) preferably uses location information about the requesting client in order to select an "optimal" or "best" location from which the client should request a resource. However, a selector system often does not know an exact location (network location or otherwise) of the requesting client, and must often make assumptions about that location.

For example, in a conventional configuration, a name server would not have knowledge of where a requesting client is physically or logically located or of the network address of the client. Thus, e.g., the CDN name server 610 (and thus the selector 118) may only know the location of a name server associated with the client (e.g., via an IP address of that name server). The client's name server may be located in a vastly different location than the requesting end-user. As such, since the selector system 118 associated with CDN name server 610 uses location information, it would rendezvous requests from the client to locations that it considers "optimal" or "best" for the client's name server (even though those locations are potentially sub-optimal for the actual client).

Thus, in some embodiments, a customized domain name comprises an address associated with an end-user/client (e.g., IP address of client 604). Using this information, name server 610 (and the selector system 118 associated therewith) can determine a more appropriate rendezvous location for requests from that client.

It is useful for a CDN's rendezvous system to make resolution decisions based on information related to the content being requested. For example, the rendezvous system may direct clients to different levels in the CDN based on some measure (e.g., static or dynamic) of popularity of the requested resource. If information about a requested resource can be included in a modified domain name, then the rendezvous system (e.g., the DNS name servers) can use that information to direct resource requests. The rendezvous system can also use that information to keep track of requested resources.

Figure 7A:
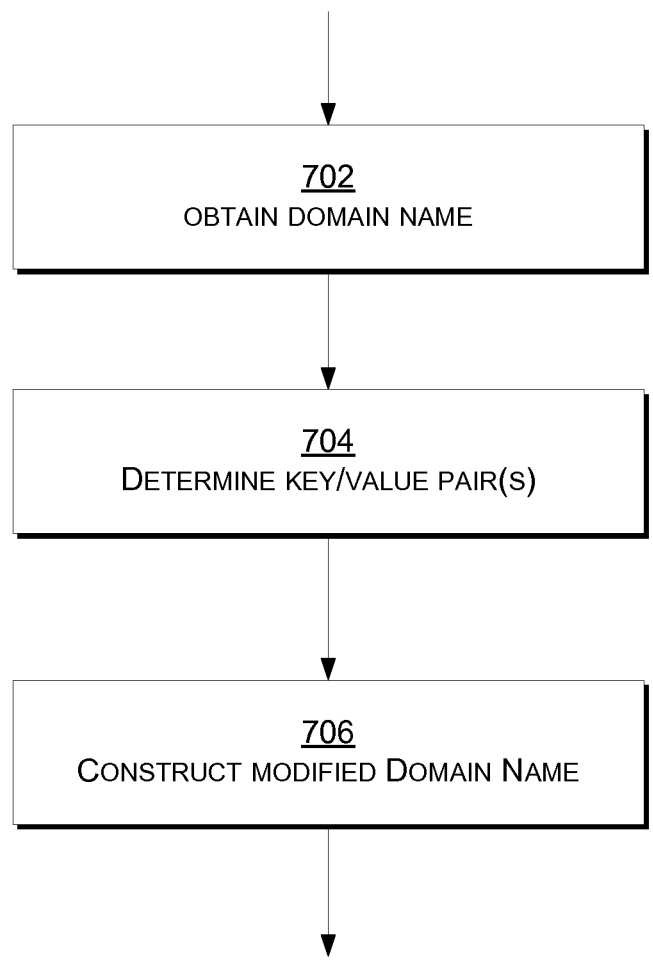
Figure 7B:
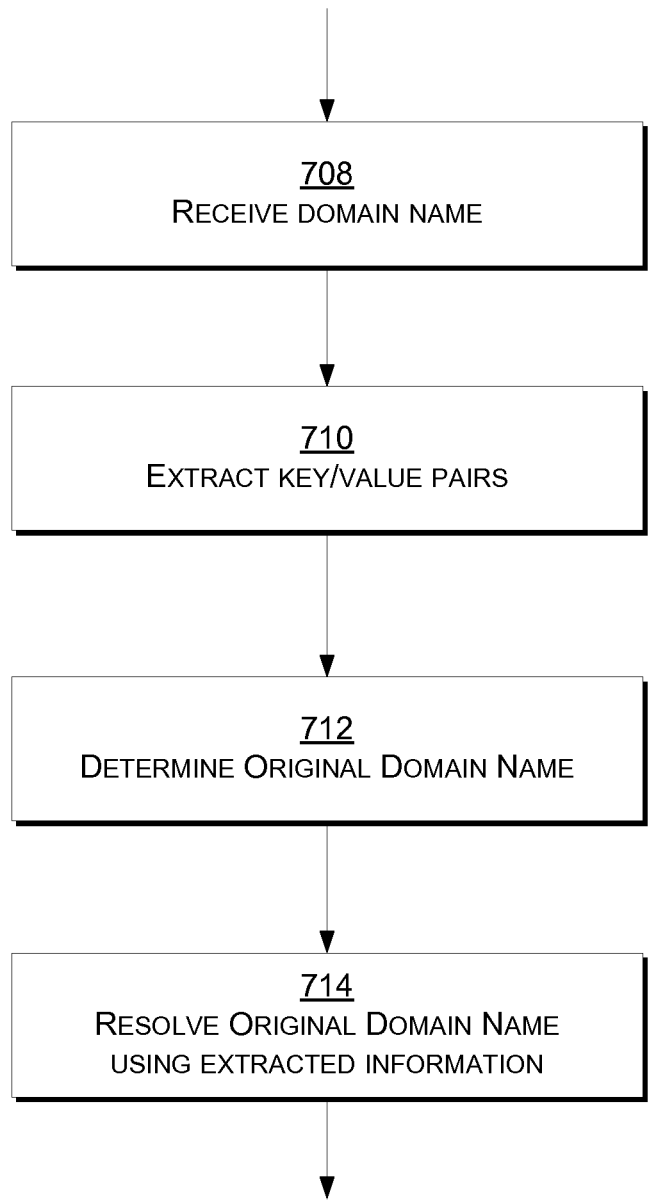

FIG. 7a is a flowchart of various actions performed by a customized domain name routine, and FIG. 7b is a flowchart of various actions performed by a CDN name server (or a name server authoritative for the domain).

With reference to FIG. 7a, the routine obtains the original domain name (at 702), e.g., from the URL or as part of an HTTP request. The routine determines the values for various items and thereby determines one or more key/value pairs (at 704). The routine then constructs the modified domain name (at 706) using the various key/value pairs. Some of values may be encoded and/or encrypted.

With reference to FIG. 7b, the CDN name server receives a domain name (at 708) as part of a request for name resolution (and, e.g., rendezvous). The CDN name server extracts any key/value pairs from the domain name (at 710) and constructs or determines the original domain name (at 712). For example, for the modified domain name D2 above, the original domain name is:

B.C.com (D5)

The original domain name can be constructed or determined, e.g., by removing the key-value pairs and associated information.

The CDN name server then resolves the original domain name, preferably using at least some of the extracted information (at 714). For example, if the key-value pairs included appropriate information, the CDN DNS may use one or more of the attribute values to determine a popularity value associated with the requested content. Similarly, if the key-value pairs include an attribute value associated with the requesting client's IP address, the CDN DNS (or the selector associated therewith) may use that information to determine a location associated with the client.

Figure 7C:
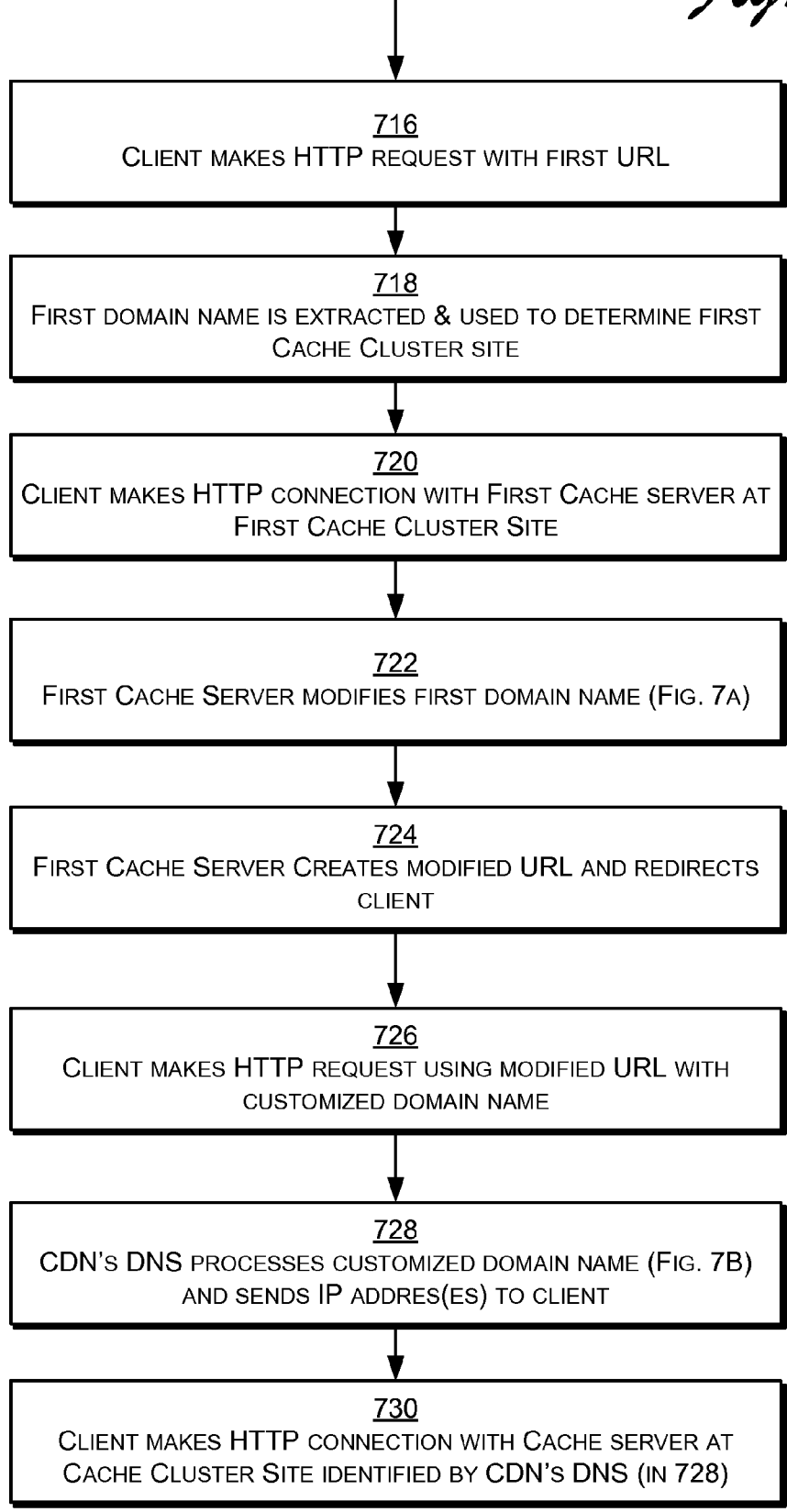

FIG. 7c is a flowchart of various actions performed in an exemplary CDN using customized domain names as described above.

The client makes an HTTP request using a first URL (having a first domain name—hostname) (at 716).

The first domain name (hostname) is extracted from first URL and is used to direct client to a first cache cluster site (at 718).

The client then makes an HTTP connection with a first cache server at the first cache cluster site (at 720).

The first cache server at first cache cluster site modifies first domain name (at 722) (e.g., as described with reference to FIG. 7a), encoding some information about request and/or about client (e.g., client's IP address, type of request, bit rates, identification of content, account information, etc.).

The first cache server creates a modified URL from first URL, the modified URL having the modified version of the first domain name, and redirects client to the modified URL (at 724).

The client receives the redirect instruction (which includes the modified URL with the customized domain name) and makes an HTTP request using the modified URL with the customized domain name (at 726).

The CDN's DNS receives the customized domain name (as part of the name resolution process) and processes it, e.g., as described with reference to FIG. 7b, sending the client IP address(es) of cache cluster site(s) determined using the modified domain name (at 728).

The client receives the information from the domain name server (e.g., IP addresses of cache cluster site(s) determined using the modified domain name) and the client makes an HTTP connection using that information (at 730).

Those of skill in the art will realize and understand, upon reading this description, that a client should not be repeatedly redirected by the cache clusters, and so a flag or other information may be provided, e.g., in an HTTP header, to prevent repeated redirection. This may also be achieved by, e.g., detection of the fact that key-value data has been introduced in the hostname, or by an indicator in the path. Those of skill in the art will realize and understand, upon reading this description, that the client may be sent back to the first cache server (by the CDN's DNS in 728) intentionally (as described below) or if, by happenstance, that server turns out to be the "best" or "optimal" server for that client.

Those of skill in the art will realize and understand, upon reading this description, that there is a certain amount of overhead associated with request redirection, and excessive redirection may adversely affect overall system performance as well as a particular clients experience. Accordingly, while the flowchart in FIG. 7c shows client requests being redirected with modified URLs, it should be appreciated that any particular embodiment or implementation may selectively redirect only certain client requests. For example, a cache cluster site may chose to redirect a client request depending on whether or not that site already has the requested resource. As another example, a cache cluster site may redirect only a small percentage of requests (e.g., 1 in 10,000 requests). Those of skill in the art will realize and understand, upon reading this description, that these selective redirection criteria may be combined with each other and that different and/or other redirection criteria may be used.

FIG. 7d is a flowchart of various actions performed in an exemplary CDN using customized domain names. In the example in FIG. 7d, only some of the client requests are redirected using modified URLs, and, in addition, preferably the client request is redirected back to the cache cluster site from which the client request was redirected.

Figure 7E:
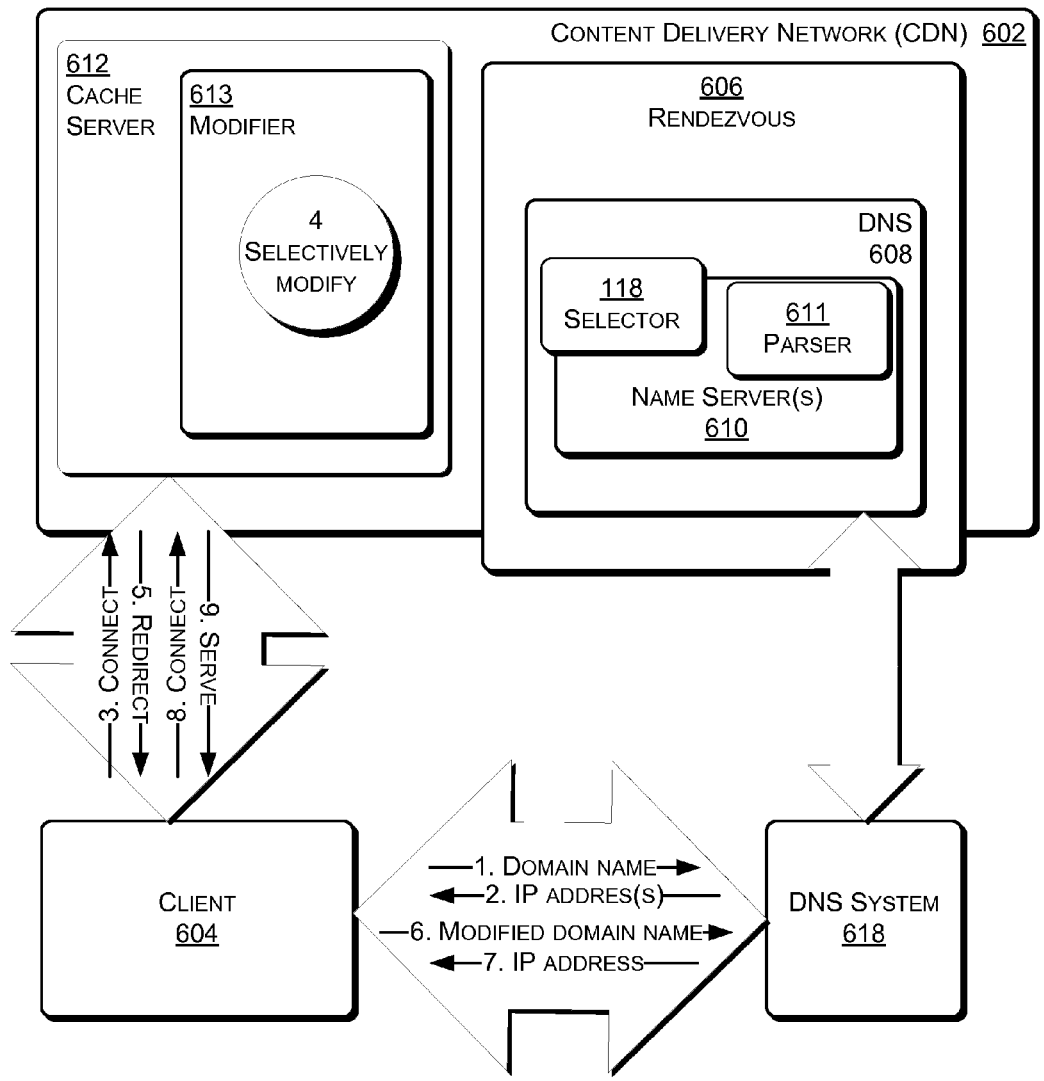
FIG. 7e depicts operation of an embodiment of a CDN using customized domain names.

With reference to FIG. 7e and the flowchart in FIG. 7d, the client makes a request with a first URL (at 732). The domain name is extracted from the first URL and is used to determine a cache cluster site in the CDN 602 from which the requested content will be served (at 734). In this processing, the extracted domain name (also referred to as the first domain name) is sent to the DNS system 618 (step 1 in FIG. 7e) by the client's resolver. The DNS system, using CDN name server(s) 610 that are authoritative for the first domain resolve the first domain to one or more locations (e.g., cache cluster sites or cache servers) in the CDN 602. The CDN name server(s) 610 may use the selector mechanism 118 to select a location in the CDN to handle this request. The DNS system provides the client 604 with one or more IP addresses corresponding to the location(s) selected by the CDN (e.g., by the CDN rendezvous mechanism 606) (step 2 in FIG. 7e).

The client uses one of the one or more IP addresses to make a connection with a cache server 612 (or cache server site) in the CDN (at 736, step 3 in FIG. 7e). (For this discussion, the cache server to which the client connects is referred to as the first cache server.)

The first cache server receives the client request and determines (at 738) whether or not this particular request should be redirected using a modified URL. If the request is not to be redirected, the client is served by the first cache server (at 740) in the manner described above (the first cache server may have to obtain the required content from another location such as a peer server or an origin server before serving it to the client).

The determination (at 738) as to whether to redirect the client request (with a modified URL) may be made based on a number of factors, including some or all of the following criteria:

1. No more than one in every x requests are redirected, where x may be, e.g., 10,000.
2. Only redirect requests for which the first cache server already has the content. Since, in this embodiment, the client will be redirected back to the first cache server, applying this particular criterion will mean that if a client is redirected then that client will not also have to wait, upon its return, for the first cache server to obtain the requested content.
3. Do not redirect any request that was already redirected.
4. Redirect some percentage of requests of a certain type or for certain content providers.

Those of skill in the art will realize and understand, upon reading this description, that different and/or other criteria may be used to redirect client requests.

If the first cache server determines (at 738) that the client request is to be redirected (at 742 and step 4 in FIG. 7e), then the first cache server creates a modified domain name based, at least in part, on the domain name that was used by the client in the initial request. The modified domain name preferably contains information about the client and/or about the request. This information preferably includes information from the HTTP headers and information that was used by the client to make the HTTP request to the first cache server. It will be appreciated that the first cache server has access (e.g., from the HTTP headers) that was not available to the DNS system when the first domain name was resolved. By encoding this information into a modified or customized domain name, the DNS system will be able to obtain information about the client and/or about the network. Such information may be used by the DNS system in subsequent name resolution. Since the client will be redirected back to the first cache server, the modified domain name preferably includes an IP address of the first cache server.

The first cache server creates a modified URL (using the modified domain name) and redirects the client to the modified URL (at 744, and Step 5 in FIG. 7e). The first cache server may use an HTTP "REDIRECT" instruction or some other appropriate redirection technique to perform the redirection.

Upon receipt of the redirect instruction with the modified URL, the client 604 extracts the customized/modified domain name and provides it to the DNS system 618 for resolution (at 746, step 6 in FIG. 7e). The modified domain name is processed by the name server(s) 610 to extract information encoded therein (at 748) and then the name server provides the client with the IP address of the first cache server (step 7 in FIG. 7e). Since the modified domain name includes an IP address of the first cache server, the name server 610 can determine where to send the client request.

The client makes a connection with the first cache server (at 750, 8 in FIG. 7e), and requests the content.

The first cache server serves the content to the client (740 and step 9 in FIG. 7e).

As an example, suppose that the first request is made with URL1 http://PQR.CDN.net/path/ABC.mov (URL1)

from client X with an IP address 123.234.212.123. The original hostname "PQR.CDN.net" is used by the DNS and the selector to direct the client to a particular first cache server (e.g., at IP address 222.111.123.10). That first cache server modifies the first URL to include a modified hostname which includes the first cache server's IP address. It should be appreciated that each cache server may have multiple IP addresses, and the cache server may chose which IP address to use in the rewriting. In this way the cache server may use some of the IP addresses to avoid subsequent redirection. In this example a modified hostname may look something like:
IP_from_222_111_123_10_IP_Client_123_234_212_123_Content_Movie.PQR.CDN.net.

In this example the modified hostname (above) includes an encoding of the client's IP address, an encoding of an IP address of the first cache server, and information (possibly encoded) about the content being requested ("Content_Movie").

In some cases the client's IP address may be included in the modified hostname. In this way, the DNS system can get some or all of the following information about the network:
client IP (from modified hostname)
resolver IP (source IP of the DNS queries and where the DNS responses are sent);
cache IP (from modified hostname; also first DNS choice, given resolver IP as input).

Those of skill in the art will realize and understand, upon reading this description, that the hostname is modified in a manner that allows the name server's parser to extract the encoded and embedded information.

Using this approach, the DNS system can determine useful information about the network. E.g., a DNS name server can determine where resolvers are relative to their clients. Often the location of a resolver can be used as an approximation of the location of a client, and it is preferable to know where a resolver (and a client) actually are located in a network.

Some content providers (e.g., streaming video providers) may know more about their customers than other providers. These content providers may require registration or the like, and they may use that information to obtain information about their customers. In addition, certain content providers (e.g., again, steaming video providers) may require their end users to use specific client-side systems. For instance, a streaming video provider may require its users to use certain client-side software for accounting purposes as well as for rendering content. In these cases, the content provider's client-side software can modify URLs before the initial request. In these cases, when a cache server gets the first request from a client, that request has already been made using a modified URL (modified by the client-side program). As with the previous examples, the information provided in the modified domain names can be collected by the DNS name servers for use in the current and/or subsequent processing.

Those of skill in the art will realize and understand, upon reading this description, that the name server(s) may act as collectors of information, and that they may provide this information to one or more other mechanisms for processing.

While the description above has focused on the HTTP protocol, it should be appreciated that other protocols may be used (e.g., RTSP for streaming media, and SIP used for VoIP). Those of skill in the art will realize and understand, upon reading this description, that the invention is not limited by the particular protocol described herein, and any system that uses a DNS to resolve a hostname is contemplated herein.

In addition, although the description above has focused, by way of example, on content delivery and CDNs, other aspects and uses are contemplated, and those of skill in the art will realize and understand, upon reading this description, that other applications of the system may be used.

Although described herein using a DNS, it should be appreciated that, in some aspects, a DNS provides a directory service (providing a mapping from keys to corresponding values). Thus, at one level, the system provides a generic IPC (Inter-process communication) mechanism for networked agents, incorporating the use of a directory service (e.g., DNS). In the case of a CDN, the agents are generally two or more of the HTTP server, the HTTP client, and the DNS server. However, as will be appreciated by those of skill in the art, upon reading this description, other application protocols and other agents are contemplated.

Figure 8:
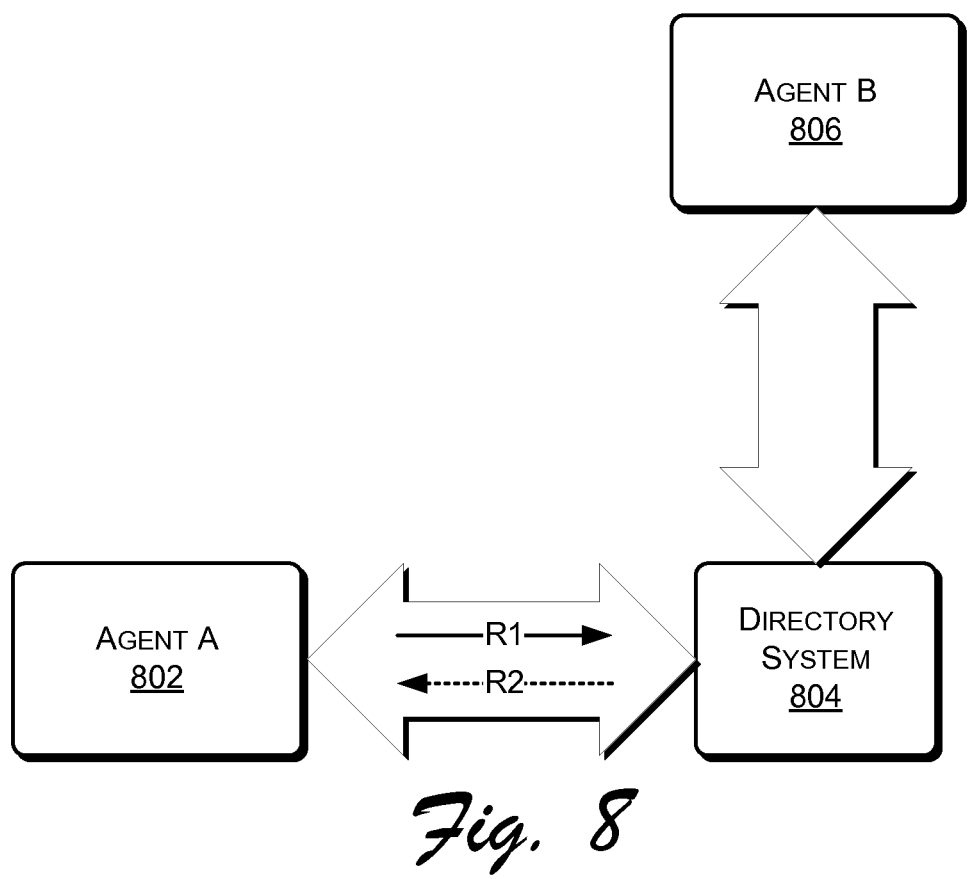
FIG. 8 depicts communication via a directory system.

For example, as shown in FIG. 8, an agent (Agent A) 802 may provide information to a directory system 804 by means of a request $R_1$. The request $R_1$ may encode information for use by the directory system 804 (or by some other agent (e.g., Agent B, 806). The directory system 804 may provide a response to Agent A (e.g., $R_2$), although, as shown by the dotted line in FIG. 8, the response may be optional.

The request $R_1$ may encode information in the form of a specially created key for use by the directory system 804. For example, as shown in the description above, the directory system 804 may comprise a DNS system, and the key may comprise a FQDN.

Information encoded in the request $R_1$ may be extracted by the directory system 804 and used to determine or provide a response $R_2$ to Agent A (the requestor). Some or all of that information may be provided (alone or with other information from other requests) to a second agent (Agent B, 806) in the drawing. It should be appreciated that Agent A has no direct communication with (and possibly no knowledge of) Agent B, and that information from Agent A is communicated to Agent B via the directory system 804.

Information in a request (e.g., $R_1$) may be used transactionally, as part of filling that request (e.g., to generate the response $R_2$). Information in a request may also (or instead) be collected and/or reported elsewhere for later use. The later use may be by the directory system itself or by some other entity or agent. Information may be used and reported alone or in some consolidated form.

In the general case, information provided in the request $R_1$ from Agent A to the directory system may be encoded in the form of key-value pairs (as duplex data), as monadic tokens (simplex data), as lists of monadic values (tuple data); or as one-to-many key-value sets (multiplex data).

In the above description, the so-called "agents" may be processes, in which case the so-called "directory system" provides a mechanism for one process (agent A) to communicate with another process (agent B).

In the context of the CDN described above, the directory system 804 corresponds to a DNS (e.g., DNS 122 in FIG. 3), and Agent A corresponds, e.g., to client 120 in FIG. 3.

Computing

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

Figure 9:
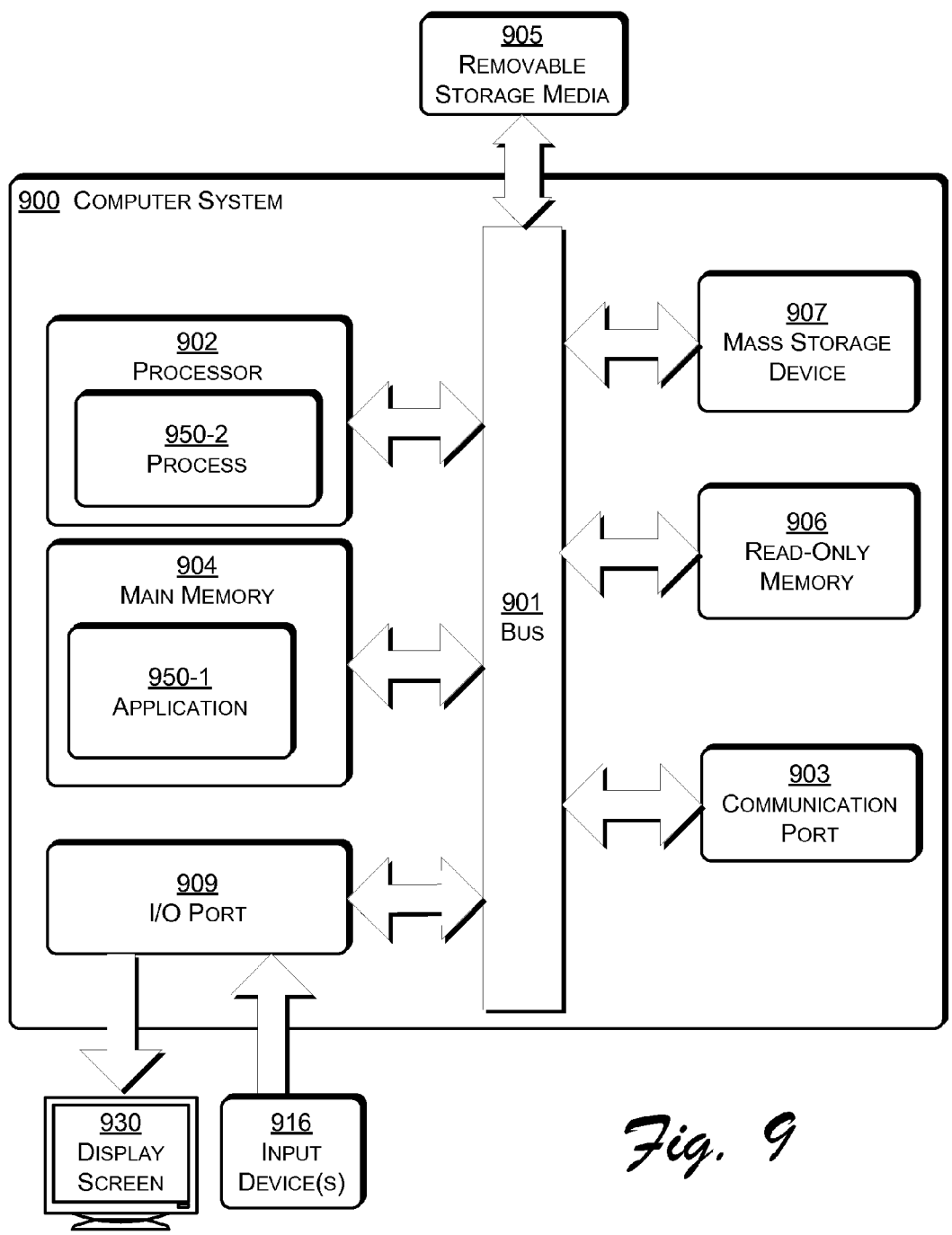
FIG. 9 is a schematic diagram of a computer system.

FIG. 9 is a schematic diagram of a computer system 800 upon which embodiments of the present disclosure may be implemented and carried out.

According to the present example, the computer system 800 includes a bus 801 (i.e., interconnect), at least one processor 902, at least one communications port 903, a main memory 904, a removable storage media 905, a read-only memory 906, and a mass storage 907.

Processor(s) 902 can be any known processor, such as, but not limited to, an Intel® Itanium® or Itanium 2® processor(s), AMD® Opteron® or Athlon MP® processor(s), or Motorola® lines of processors, and the like. Communications port(s) 903 can be any of an RS-232 port for use with a modem based dial-up connection, a 10/100 Ethernet port, a Gigabit port using copper or fiber, or a USB port, and the like. Communications port(s) 903 may be chosen depending on a network such as a Local Area Network (LAN), a Wide Area Network (WAN), a CDN, or any network to which the computer system 900 connects. The computer system 900 may be in communication with peripheral devices (e.g., display screen 930, input device(s) 916) via Input/Output (I/O) port 909.

Main memory 904 can be Random Access Memory (RAM), or any other dynamic storage device(s) commonly known in the art. Read-only memory 906 can be any static storage device(s) such as Programmable Read-Only Memory (PROM) chips for storing static information such as instructions for processor 902. Mass storage 907 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 901 communicatively couples processor(s) 902 with the other memory, storage and communications blocks. Bus 901 can be a PCI/PCI-X, SCSI, a Universal Serial Bus (USB) based system bus (or other) depending on the storage devices used, and the like. Removable storage media 905 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM), etc.

Embodiments herein may be provided as a computer program product, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements which are appropriate to perform the methods.

As shown, main memory 904 is encoded with application 950-1 that supports the functionality as discussed herein (the application 950-1 may be, e.g., the parser 611 or the modifier 613). Application 950-1 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 902 accesses main memory 904 via the use of bus 901 in order to launch, run, execute, interpret or otherwise perform the logic instructions of the application 950-1. Execution of application 950-1 produces processing functionality in content delivery process 950-2. In other words, the content delivery process 950-2 represents one or more portions of the application 950-1 performing within or upon the processor(s) 902 in the computer system 900.

It should be noted that, in addition to the content delivery process 950-2 that carries out operations as discussed herein, other embodiments herein include the application 950-1 itself (i.e., the un-executed or non-performing logic instructions and/or data). The application 950-1 may be stored on a computer readable medium (e.g., a repository) such as a floppy disk, hard disk or in an optical medium. According to other embodiments, the application 950-1 can also be stored in a memory type system such as in firmware, read only memory (ROM), or, as in this example, as executable code within the main memory 904 (e.g., within Random Access Memory or RAM). For example, application 950-1 may also be stored in removable storage media 905, read-only memory 906, and/or mass storage device 907.

Example functionality supported by computer system 900 and, more particularly, functionality associated with application 950-1 is discussed above with reference to FIGS. 6 and 7*a*-7*b*.

Those skilled in the art will understand that the computer system 900 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of skill in the art will appreciate that the process may operate without any user intervention. In another embodiment, the process includes some human intervention (e.g., a step is performed by or with the assistance of a human).

It should be appreciated that the words "first" and "second" in the claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed:

1. A computer-implemented method, operable in a content delivery network (CDN) comprising a plurality of cache servers, the method comprising:
   (A) receiving, at a cache server in the CDN, a client request for a resource, wherein the client request comprises a first domain name;
   (B) determining one or more values forming part of the client request;
   (C) determining whether said cache server has said requested resource;
   (D) in response to determining that said cache server has said requested resource, generating a second domain name to direct the client to said cache server for subsequent requests for said requested resource, said second domain name including first information from said first domain name and second information determined from said one or more values forming part of the client request;
   (E) providing the second domain name to the client; and
   (F) receiving, at said cache server, a subsequent request for said requested resource, the subsequent request comprising said second domain name.

2. The method of claim 1 wherein the first domain name is a hostname from a first uniform resource locator (URL) that was used to request the resource from the cache server.

3. The method of claim 2 wherein the client request is an HTTP request, and wherein the determining in (B) comprises:
   determining at least one value from an HTTP header associated with the HTTP request.

4. The method of claim 2 wherein the client request is an HTTP request, and wherein the providing in (E) comprises:
   (e1) creating a second URL by modifying the first URL to replace the hostname from the first URL with the second domain name; and
   (e2) providing the client with the second URL.

5. The method of claim 4 wherein the second URL is provided to the client in (e2) using an HTTP REDIRECT.

6. The method of claim 4 wherein the second URL is provided to the client in (e2) as a URL embedded within a resource.

7. The method of claim 1 wherein the one or more values forming part of the client request include one or more of:
   a network address of the client;
   a type of device associated with the client;
   a type of content associated with the client request;
   an identification of the requested object; and
   a data transmission rate.

8. The method of claim 7 wherein the client request is an HTTP request, and wherein the network address is an Internet Protocol (IP) address of the client.

9. The method of claim 7 wherein the type of device is selected from: phone, computer, television, set-top box.

10. The method of claim 1 wherein the second information is associated with one or more keys, and wherein the second domain name comprises said one or more keys and a corresponding one or more key values.

11. An apparatus comprising:
    a server comprising a computer processor and configured to:
    (a) receive, at the server, a client request for a resource, wherein the client request comprises a first domain name;
    (b) determine one or more values forming part of the client request;
    (c) determine if the server has the requested resource;
    (d) in response to determining that the server has the requested resource, generate a second domain name to direct the client to the server for subsequent requests for the requested resource, said second domain name including first information from said first domain name and second information relating to said one or more values forming part of the client request;

(e) provide the second domain name to the client; and
(f) receive, at the server, a subsequent request for the requested resource, the subsequent request comprising the second domain name.

12. The apparatus as in claim 11 wherein the server is a cache server operable in a content delivery network (CDN).

13. The apparatus as in claim 11 wherein the server is an origin server operable in a content delivery network (CDN).

14. The server as in claim 11 wherein the one or more values forming part of the client request include one or more of:
- a network address of the client;
- a type of device associated with the client;
- a type of content associated with the client request; and
- a data transmission rate.

15. The server as in claim 11 wherein the second information is associated with one or more keys, and wherein the second domain name comprises said one or more keys and a corresponding one or more key values.

16. An apparatus comprising:
a device comprising a computer processor configured to:
  (a) receive a request for a resource from a cache server, wherein the request comprises a first domain name;
  (b) determine one or more values forming part of the request;
  (c) determine whether said cache server has the requested resource;
  (d) in response to determining that said cache server has the requested resource, generate a second domain name to direct a client device associated with the request to said cache server for subsequent requests for the requested resource, said second domain name including first information from said first domain name and second information forming part of said one or more values forming part of the request; and
  (e) provide the second domain name.

17. The apparatus of claim 16 wherein the device comprises a plugin.

18. The apparatus of claim 16 wherein the device comprises a client-side script.

19. The apparatus of claim 16 wherein the one or more values associated with the request include one or more of:
- a network address of a client;
- a type of device associated with a client;
- a type of content associated with the request; and
- a data transmission rate.

20. The apparatus of claim 16 wherein the second information is associated with one or more keys, and wherein the second domain name comprises said one or more keys and a corresponding one or more key values.

21. A computer-implemented method, operable in a content delivery network (CDN) comprising a plurality of cache servers, the method comprising:
  (A) receiving, at a cache server in the CDN, a client request for a resource from said cache server, wherein the client request comprises a first domain name;
  (B) determining one or more values forming part of the client request;
  (C) determining if said cache server has said requested resource;
  (D) in response to determining that said cache server has said requested resource, generating a second domain name to direct the client to said cache server for subsequent requests for said requested resource, said second domain name including first information from said first domain name and second information determined from said one or more values forming part of the client request;
  (E) providing the second domain name to the client; and
  (F) receiving, at said cache server, a subsequent request for said requested resource, the subsequent request comprising said second domain name;
  wherein the one or more values forming part of the client request include one or more of:
  a network address of the client;
  a type of device associated with the client;
  a type of content associated with the client request; and
  a data transmission rate.

* * * * *